United States Patent Office 2,922,789
Patented Jan. 26, 1960

2,922,789
N-PROPYLAMIDE DERIVATIVES

Gerhard R. Wendt, Havertown, Pa., assignor to American Home Products Corporation, New York, N.Y., a corporation of Delaware No Drawing. Application July 22, 1958
Serial No. 750,092

6 Claims. (Cl. 260—270)

This invention relates to N-propylamide derivatives. More particularly it relates to mercuri-propyl amides having the following type formula

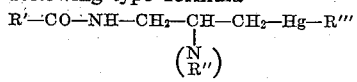

in which R' may be a carbocyclic, heterocyclic or N-substituted aminoalkyl group characterizing an acid amide, R'' may be a hydrocarbon chain forming part of a 5–6 member carbon-nitrogen heterocycle and R''' may be chlorine, bromine or a 5–6 member carbon-nitrogen heterocycle attached to the mercury of the nitrogen atom. These are basic compounds which readily form acid addition salts and such salts are included in the invention.

In my previous Patent No. 2,800,471 for N-Propylurea Derivatives, patented July 23, 1957, I disclosed and claimed certain N-propylurea derivatives which have valuable chemical and physiological properties.

The novel compounds disclosed herein differ from those of the prior patent chiefly in that the nitrogen atom on the number 1 atom of the propane chain, instead of being part of an N-substituted urea, is part of an organic carbocyclic, heterocyclic or N-substituted aliphatic amino acid amide residue.

These novel compounds have utility as intermediates in chemical synthesis, as oral diuretics in veterinary practice and as antibacterial and antifungal agents.

These compounds may be prepared by reacting an appropriate N-allylamide or -imide with a carbon-nitrogen heterocyclic compound whose radical is desired in the No. 2 position and with mercuric chloride or bromide. The mercuric compound may be added as a powder or dissolved in an appropriate solvent such as ethyl acetate. The reaction is preferably carried out at or somewhat below room temperature.

The following examples describe preferred embodiments of my invention, but these are intended to be illustrative only and not to limit my invention the scope of which is defined in the appended claims.

N - (3 - chloromercuri - 2 - piperidinopropyl) nicotinamide, N - (3 - chloromercuri - 2 - pyrrolidinopropyl) isonicotinamide and N - (3 - piperidinomercuri - 2 - piperidinopropyl) benzamidoacetamide show antibacterial and antifungal activity against gram-positive and gram-negative bacteria, fungi and yeasts, including in vitro activity against at least one strain of human *M. tuberculosis*.

These three compounds together with N-(3-chloromercuri-2-piperidinopropyl) phthalamic acid and N-(3-chloromercuri-2-piperidinopropyl) benzamide are effective diuretics for dogs when administered orally.

EXAMPLE 1

*N-(3-chloromercuri-2-piperidinopropyl) phthalamic acid*

To a solution of 46.8 g. (=0.25 M) of N-allylphthalimide in 125 ml. of ethyl acetate was added 124 ml. (=1.25 M) of piperidine. After cooling the mixture to 10–15° C. a solution of 67.9 g. (=0.25 M) of mercuric chloride in 300 ml. of ethyl acetate was added dropwise and with stirring over a period of two hours. Stirring was continued for two hours while the reaction mixture was attaining room temperature. After shaking for 90 hours a white crystalline product consisting mostly of piperidine hydrochloride was removed by filtration and the filtrate was added dropwise while stirring to 2.5 l. of water, and thereafter stirring was continued for 20 hours. A small amount of a grayish insoluble material was removed by filtration. The filtrate was extracted with three portions of 200 ml. of ether. The pH of the aqueous layer was adjusted to 6.5 by adding 350 ml. of 1 N acetic acid. After standing for a few days in the cold room a crystalline product separated which was collected on a Buchner funnel and dried. Yield 59.1 g. (45%). M.P.[1] 144–145° C. (dec.).

*Analysis.*—Calcd. for $C_{16}H_{21}ClHgN_2O_3$: Hg, 38.18; N, 5.33; Cl, 6.75. Found: Hg, 37.95; N, 5.42; Cl, 6.80.

The compound (free base) has the following structure:

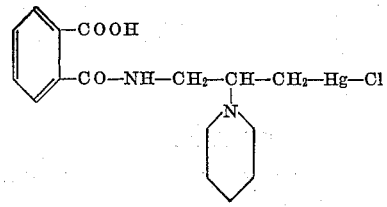

EXAMPLE 2

*N-(3-chloromercuri-2-piperidinopropyl) benzamide*

To a solution of 16.1 g. (0.10 M) of N-allylbenzamide in 100 ml. of piperidine was added 27.2 g. (0.10 M) of pulverized mercuric chloride in small portions with shaking. After the addition of mercuric chloride was complete shaking was continued for 80 hours. A small amount of metallic mercury and about 11 g. of piperidine hydrochloride were removed by filtration and the filtrate was evaporated to dryness in vacuo. Residue was dissolved in 100 ml. of ethanol by warming on a water bath. To the solution ether (680 ml.) was added to incipient turbidity. On standing at −5° C° for a day a precipitate was formed. Ether (170 ml.) was added and on standing for another day at −5° C. the precipitate increased. The ether layer was decanted and concentrated to about 400 ml. in vacuo and added with stirring to 1600 ml. of ice-water forming a viscous precipitate which after triturating with four 400 ml. portions of water solidified. After drying it weighed 25.3 g. (53%). The material is readily soluble in methanol, ethanol and chloroform. Addition of ether to a solution of the material in chloroform yielded an analytically pure compound. The melting point of material obtained by reprecipitation was not definite depending upon the solvents used. For analysis a sample of the material was dried at 56° C., 0.3 mm. for one hour.

*Analysis.*—Calcd. for $C_{15}H_{21}ClHgN_2O$: Hg, 41.67; N, 5.82. Found: Hg, 41.51; N, 5.68.

The compound (free base) has the following structure:

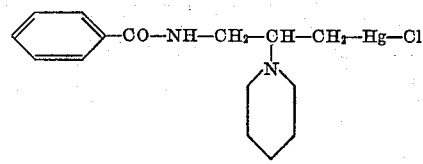

---

[1] All melting points are uncorrected.

EXAMPLE 3

N-(3-chloromercuri-2-piperidinopropyl) nicotinamide

To a solution of 8.1 g. (0.05 M) of N-allylnicotinamide in 49.5 ml. (0.50 M) of piperidine was added 13.6 g. (0.05 M) of pulverized mercuric chloride in small portions and with shaking. After the addition of mercuric chloride was complete shaking was continued for 20 hours. Then 200 ml. of ethyl acetate was added to the reaction mixture. After filtering the filtrate was evaporated to dryness in vacuo (bath 25–30° C.) and the residue further dried over concentrated $H_2SO_4$ in vacuo. It was dissolved in 77 ml. of 2 N hydrochloric acid at 25° C. and filtered through activated charcoal. Addition of acetone to the filtrate yielded 23 g. (83%) of the crystalline hydrochloride. After recrystallizing from aqueous alcohol it melted 112.5–113.5° C.

*Analysis.*—Calcd. for the di-hydrochloride

$$C_{14}H_{22}Cl_3HgN_3O$$

Hg, 36.12; Cl, 19.15. Found: Hg, 36.16; Cl, 18.70.
The compound (free base) has the following structure:

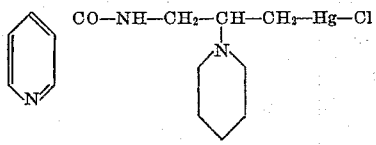

EXAMPLE 4

N-(3-chloromercuri-2-pyrrolidinopropyl) isonicotinamide

To a solution of 8.1 g. (0.05 M) of N-allylisonicotinamide in 41.7 ml. (0.50 M) of pyrrolidine was added 15.0 g. (0.055 M) of pulverized mercuric chloride in small portions and with shaking. After the addition of mercuric chloride was complete shaking was continued for 24 hours. The solution was decanted from a small amount of metallic mercury. Upon addition of 100 ml. of ether two layers formed. The upper layer was decanted and the remaining oil was triturated five times with 50 ml. each of ether. The resultant sirup was finally dried over phosphorus pentoxide, giving 25 g. The product was dissolved in 84 ml. of 1 N hydrochloric acid and filtered. The volume of the filtrate was reduced to 50 ml. in vacuo. When a solution of 29 g. of benzilic acid in 84 ml. of 1 N sodium hydroxide was added a brown gum precipitated which was washed twice with 50 ml. of water. On triturating the gum with 100 ml. of acetone a white crystalline product was obtained which was collected and washed with 100 ml. of acetone, yielding 7.9 g. After recrystallizing from water the monohydrochloride melted at 151–151.5° C. (dec.). For analysis a sample was dried at 80° C., 1 hour at $10^{-3}$ mm.

Calcd. for the mono-hydrochloride $C_{13}H_{19}Cl_2HgN_3O$: Hg, 39.74. Found: Hg, 39.57.

The compound (free base) has the following structure:

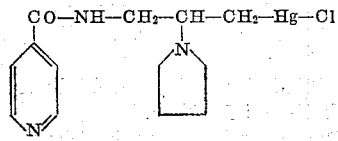

EXAMPLE 5

N-(3-piperidinomercuri-2-piperidinopropyl) benzamidoacetamide

To a solution of 10.9 g. (0.05 M) of N-allylhippuramide in 75 ml. of piperidine was added dropwise with stirring a solution of 13.6 g. (0.05 M) of mercuric chloride in 60 ml. of ethyl acetate. After the addition of mercuric chloride was complete stirring was continued for 20 hours. On standing for several days in the cold room crystals of the monohydrochloride separated which were collected. The material was twice suspended in 120 ml. of water and vigorously stirred for 10 minutes. After filtering and drying the material weighed 23.1 g. (74%). It melted 121–122° C. (dec.) after recrystallizing from ethyl acetate.

*Analysis.*—Calcd. for the monohydrochloride

$$C_{22}H_{35}ClHgN_4O_2$$

Hg, 32.17; N, 8.99; C, 42.37; H, 5.66; Cl, 5.69. Found: Hg, 31.88; N, 9.04; C, 42.39; H, 5.79; Cl, 5.34.

The compound (free base) has the following probable structure:

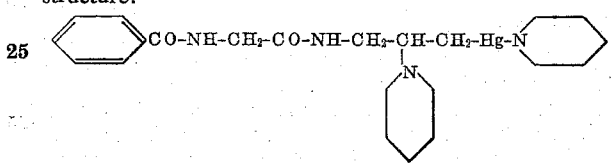

In this synthesis it was found necessary to use a large excess of piperidine in order to obtain a crystalline end product. As a result the piperidino group appears to have displaced the chlorine on the mercury atom.

I claim:
1. Substituted N-mercuripropyl amides having the type formula

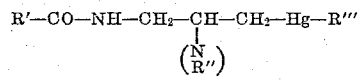

and the acid addition salts thereof in which R' is a radical selected from the group consisting of phenyl, carboxyphenyl, benzamidomethyl, and pyridyl, R" is a polymethylene radical selected from the group consisting of 1,4-tetramethylene and 1,5-pentamethylene, and R''' is a radical selected from the group consisting of —Cl, —Br, —N-piperidino and —N-pyrrolidino.

2. N-(3-chloromercuri-2-piperidinopropyl) phthalamic acid.
3. N-(3-chloromercuri-2-piperidinopropyl) benzamide.
4. N-(3-chloromercuri-2-piperidinopropyl) nicotinamide.
5. N-(3-chloromercuri-2-pyrrolidinopropyl) isonicotinamide.
6. N-(3-piperidinomercuri-2-piperidinopropyl) benzamidoacetamide.

References Cited in the file of this patent

UNITED STATES PATENTS

| | | |
|---|---|---|
| 2,136,501 | Hartmann et al. | Nov. 15, 1938 |
| 2,635,982 | Rowland | Apr. 21, 1953 |
| 2,800,471 | Wendt | July 23, 1957 |
| 2,834,795 | Wendt | May 13, 1958 |

FOREIGN PATENTS

| | | |
|---|---|---|
| 792,992 | Great Britain | Apr. 9, 1958 |